(12) United States Patent
Ohtani et al.

(10) Patent No.: US 6,692,848 B2
(45) Date of Patent: Feb. 17, 2004

(54) MAGNETIC DISK APPARATUS

(75) Inventors: Toshiaki Ohtani, Yokohama (JP); Naotoshi Akamatsu, Fujisawa (JP); Kazufumi Azuma, Yokohama (JP); Kenji Tasaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 91 days.

(21) Appl. No.: 09/884,166

(22) Filed: Jun. 20, 2001

(65) Prior Publication Data

US 2002/0012817 A1 Jan. 31, 2002

(30) Foreign Application Priority Data

Jun. 20, 2000 (JP) .......................... 2000-189722
Mar. 21, 2001 (JP) .......................... 2001-080260

(51) Int. Cl.⁷ .......................... G11B 5/66; G11B 17/22
(52) U.S. Cl. .......................... 428/694 TF; 428/694 TP; 428/391; 428/447; 360/97.02
(58) Field of Search .......................... 360/88, 93, 97.01, 360/97.02, 97.03, 97.04, 137, 220, 224, 900; 324/755; 428/34.1, 65.3, 692, 694 R, 694 BP, 694 BF, 694 TP, 694 TF, 900, 391, 447; 118/729, 730, 733

(56) References Cited

U.S. PATENT DOCUMENTS

| 5,229,899 | A | * | 7/1993 | Brown et al. | ............ 360/97.02 |
|---|---|---|---|---|---|
| 5,331,487 | A | * | 7/1994 | Gregory et al. | ........ 428/694 TP |
| 5,582,411 | A | * | 12/1996 | Tyler | ........................ 360/97.02 |
| 5,909,337 | A | * | 6/1999 | Tyndall, III | ............... 360/97.01 |
| 6,288,559 | B1 | * | 9/2001 | Bernier et al. | ............... 324/755 |
| 6,296,691 | B1 | * | 10/2001 | Gidumal | ......................... 96/17 |
| 6,356,407 | B1 | * | 3/2002 | Slezak | ..................... 360/97.02 |
| 6,379,801 | B1 | * | 4/2002 | Falcone et al. | ......... 428/694 TF |

FOREIGN PATENT DOCUMENTS

| JP | 60219695 | | 11/1985 |
|---|---|---|---|
| JP | 62-291723 | * | 12/1987 |
| JP | 237589 | | 2/1990 |
| JP | 636548 | | 2/1994 |
| JP | 676556 | | 3/1994 |
| JP | 6302178 | | 10/1994 |
| JP | 773659 | | 3/1995 |
| JP | 785647 | | 3/1995 |

* cited by examiner

*Primary Examiner*—Stevan A. Resan
*Assistant Examiner*—Louis Falasco
(74) *Attorney, Agent, or Firm*—Antonelli, Terry, Stout & Kraus, LLP

(57) ABSTRACT

Troubles caused by contaminants in a magnetic disk apparatus are prevented by providing a monofunctional compound in a gas phase in the magnetic disk apparatus, said compound capable of undergoing polymerization reaction with hydroxyl groups present on the protective overcoat surfaces of a magnetic head and a magnetic disk and further capable of reacting with contaminants, thereby attaining a high reliability of the magnetic disk apparatus.

7 Claims, 7 Drawing Sheets

MAGNETIC DISK APPARATUS

BACKGROUND OF THE INVENTION

The present invention relates to a magnetic disk apparatus and particularly to a magnetic disk apparatus with an improved reliability when operated for a long time.

For increasing the recording density of a magnetic disk apparatus, it has been so far a problem to narrow the distance between a magnetic disk (which will be hereinafter referred to merely as "disk") and a magnetic head (which will be hereinafter referred to merely as "head"), and many attempts have been made to lower the head flying height, make the protective overcoat formed on the head and the disk thinner, make the lubricant layer on the disk protective overcoat thinner, etc. For high speed recording or reproduction of magnetically recordable or recorded information, it has been attempted to make the disk revolution speed higher.

However, the lowering of the head flying height leads to an increase in the contact frequency between the head and the disk, ultimately to decomposition of the lubricant on the disk, wearing of the protective overcoat formed on the head and the disk, or the like, thereby considerably lowering the reliability of the magnetic disk apparatus. It is also known that the lubricant on the disk is gradually decreased by high speed revolution of the disk besides the vanishing thereof by contact with the head.

To make up for the vanished lubricant on the disk by contact with the head or for the decreased lubricant by revolution of the disk, JP-A-2-37589 and JP-A-7-73659, U.S. Pat. Nos. 4,626,941, 4,789,913, 5,138,506, 5,331,487 and 6,031,685 disclose a means of supplying a lubricant. Near-contact recording by intermittent contact of the head with the disk or contact recording by continuous contact of the head with the disk will be hereafter key technical items for further improvement of recording density, where such means of supplying a lubricant will be an essential technical item.

It is also known that in the magnetic disk apparatus some kinds of gas components adsorbed on the head or the disk undergo chemical reactions by heat, etc. generated by contact of the head with the disk, thereby forming debris between the head and the disk. Such debris formation will give fluctuations to the head flying height and will increase the contact frequency between the head and the disk, thereby erasing the recorded information on the disk or crashing the head or the disk in the worst case, or increasing the head flying height and then leading to a failure in magnetic recording or reproduction of information on the disk in some case. Indeed, in the case of increasing the contact frequency between the head and the disk due to the lowering of head flying height, a probability of trouble occurrence will be increased. Trouble-causing gas components are those outgassing from the structural members of the magnetic disk apparatus in most cases, but in some case are impurities from the process steps during the production or from the surrounding atmosphere after the production.

Various methods for reducing trouble-causing compounds on the head-disk interface (HDI) have been so far proposed (such compounds will be hereinafter referred to as "contaminants"): for example, a method of abating the contaminant by degassifying the structural members of a magnetic disk by heating, a method of removing the contaminants by adsorption by providing the apparatus with a gas adsorbent, as disclosed in JP-A-60-219695, a method of catalytically removing the contaminants by polymerization, as disclosed in JP-a-6-76556, a method of removing the trouble-causing contaminants by chemisorption by providing a magnetic disk apparatus with some kind of metals, as disclosed in JP-A-6-36548 and JP-A-6-302178. However, these methods have been found not satisfactory yet.

SUMMARY OF THE INVENTION

An object of the present invention is to provide a magnetic disk apparatus capable of preventing contaminant-causing troubles from occurrences, and improving the reliability of the apparatus when operated for a long time.

The present invention provides a magnetic disk apparatus, which comprises a casing, and at least a magnetic medium for recording information, a magnetic head for recording and reproducing magnetic information on the magnetic medium and a mechanism of driving the magnetic medium and the magnetic head, each provided in the casing, where at least one of monofunctional compounds is provided in the gas phase in the casing.

BRIEF DESCRIPTION OF THE DRAWINGS

These and other features, objects and advantages of the present invention will become more apparent from the following description when taken in conjunction with the accompanying drawings where in.

DETAILED DESCRIPTION OF THE INVENTION

Figure 1:
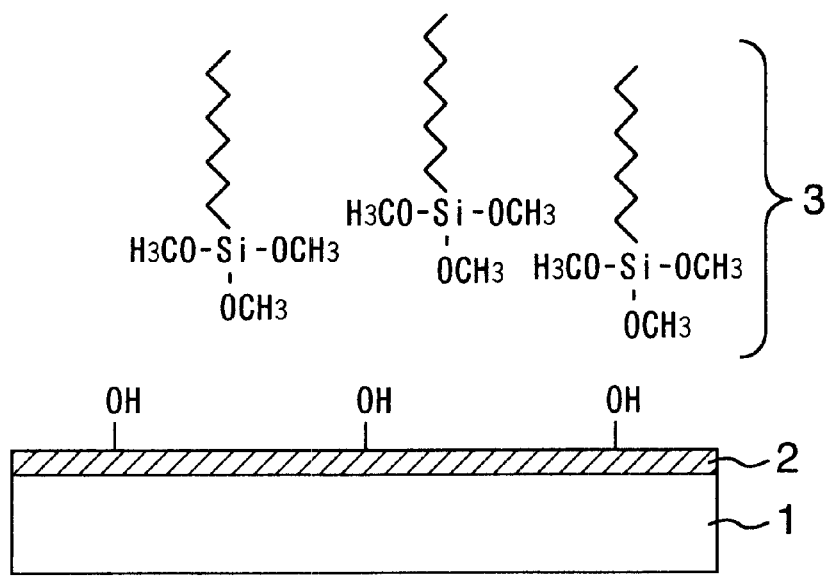
FIG. 1 is a schematic view showing the presence of hydroxyl groups on the surface of a protective overcoat and contaminants over the protective overcoat surface.

To increase the recording density of a magnetic disk apparatus, as already described in the foregoing section relating to the related art, it is necessary to reduce the head flying height, but such problems as a decrease in the lubricant, occurrences of trouble due to formation of debris by contaminants will result from the consequent increase in the contact frequency between the head and the disk.

When the lubricant on the disk is vanished, the protective overcoat as the underlayer is exposed. The protective overcoat on the disk is usually a film comprising carbon as the main component, and functional groups such as hydroxyl groups, etc. are formed on the exposed surface by the influence of oxygen or water in the air upon the exposed surface. The thus formed functional groups act as adsorption sites for contaminants to cause troubles. To maintain a high reliability of the magnetic disk during the operation for a long time, development for a means for preventing the lubricant from any decrease and trouble-causing contaminants from any adsorption at the same time has been now required.

Recent trends toward lowering of the head flying height have led to an increase in the contact frequency between the head and the disk, so that the allowable concentration of contaminants must be made lower than the concentration so far set forth, but the conventional method of removing contaminants by adsorption onto activated carbon, etc. is limited in the contaminants absorbable concentration, or it is hard to maintain the effect on contaminant adsorption for a long time.

The conventional method of removing contaminants by chemisorption by providing some kind of metals in the magnetic disk apparatus also suffers from such a problem as lowering of the chemisorption ability due to the oxygen in the air, resulting in a contaminant removal failure.

Thus, it is an object of the present invention to overcome the aforementioned problems pertaining to the conventional magnetic disk apparatuses to provide a magnetic disk apparatus capable of preventing contaminant-causing troubles from occurrences and improving the reliability of the apparatus when operated for a long time.

To attain the object of the present invention, at least one of monofunctional compounds is used by providing it in the gas phase in the casing of a magnetic disk apparatus. As the monofunctional compound, at least one of single functionality silane compounds or at least one of compounds having only one group reactable with a hydroxyl group or a carboxyl group is used by providing it in the gas phase in the casing.

As the single functionality silane compounds, compounds represented by the following formula [I] can be preferably used:

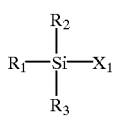

[I]

wherein $X_1$ is a hydroxyl group, an alkoxy group, an acetoxy group or a halogen atom; and $R_1$, $R_2$ and $R_3$ are independently an alkyl group, a phenyl group, an alkyl group wherein a part or whole of hydrogen atoms are substituted with fluorine atom or atoms, or a phenyl group wherein a part or whole of hydrogen atoms are substituted with fluorine atom or atoms.

It is desirable that the single functionality silane compounds have a hydroxyl group, an alkoxy group, an acetoxy group or a halogen atom as a functional group, and an alkyl group or a phenyl group. In the alkyl group or phenyl group a part or whole of hydrogen atoms can be substituted with a fluorine atom or atoms. Furthermore, alkyl compounds or phenyl compounds each having a hydroxyl group or a carboxyl group can be also used as the monofunctional compound.

As the compounds having only one group reactable with a hydroxyl group or a carboxyl group, compounds represented by the following formula [II] can be preferably used:

wherein $X_2$ is a hydroxyl group or a carboxyl group; and $R_4$ is an alkyl group wherein a part or whole of hydrogen atoms are substituted with fluorine atom or atoms or a phenyl group wherein a part or whole of hydrogen atoms are substituted with fluorine atom or atoms.

The present magnetic disk apparatus is provided preferably with a mechanism of supporting the monofunctional compound within it and a means of supplying the compound into the gas phase in the casing. A mechanism of supporting the monofunctional compound on a porous carrier or organic polymers can be used. Furthermore, the monofunctional compound can be held in a container with a fine throughhole, or a container isolated by a gas-permeable organic film.

Furthermore, the magnetic disk apparatus is provided preferably with a means of supplying the monofunctional compound into the apparatus from the outside.

To attain the object of the present invention, an adsorbent containing at least one of solid single functionality silane compounds can be provided near the magnetic recording medium in the casing of the magnetic disk apparatus. The single functionality silane compound has a hydroxyl group, an alkoxy group, an acetoxy group or a halogen atom as a functional group, and also has an alkyl group a phenyl group, an alkyl group wherein a part or whole of hydrogen atoms are substituted with an fluorine atom or atoms, or a phenyl group wherein a part or whole of hydrogen atoms are substituted with fluorine atoms, as already described above. It is desirable that the single functionality silane compound is provided therein upon isolation with a gas-permeable membrane.

The present invention will be described in detail below, referring to Examples, which should be understood as not limitative of the present invention.

EXAMPLE 1

Figure 6:
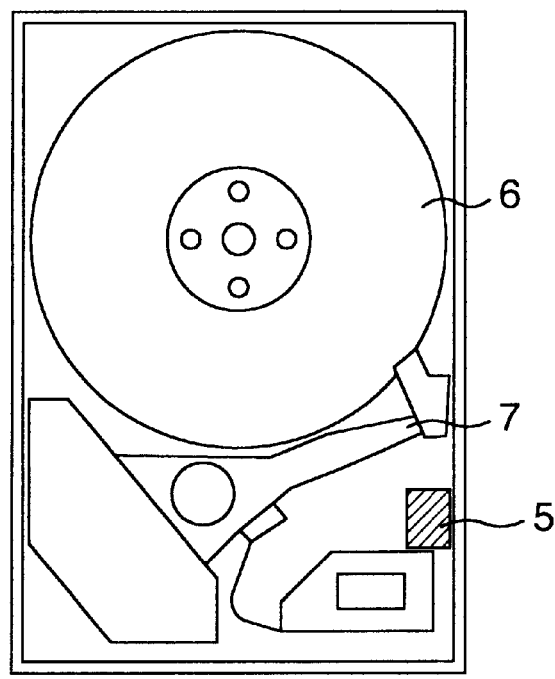
FIG. 6 is a schematic view showing a magnetic disk apparatus according to Example 1.

The structure of a magnetic disk apparatus according to one embodiment of the present invention is shown in FIG. 6. Molecular sieve was used as porous carrier 5 for supporting a monofunctional compound. A 2.5-inch type glass substrate was used for magnetic disk 6, where a magnetic medium for magnetic recording and a protective overcoat layer comprising carbon as the main component were successively formed on the disk surface, and a perfluoropolyether-based lubricant was applied to the outermost disk surface.

Figure 7:
FIG. 7 is a schematic view showing a magnetic head fixed to a suspension.

Magnetic head 8 was fixed to the tip end of suspension 7 through gimbal 9, as shown in FIG. 7. A sintered material composed of $Al_2O_3$ and TiC was used as a head slider material. A protective overcoat comprising carbon as the main component was formed on the air bearing surface of the head. The magnetic disk apparatus was provided with a cover through packings, though not shown in the drawing, to tightly seal the apparatus casing to some degree, thereby isolating the apparatus inside from the surrounding atmosphere. The disk was rotatable at 4,200 rpm. The apparatus was further provided with a motor for disk revolution, VCM (Voice Coil Motor) for head seek, an electric circuit for apparatus control, etc.

In this Example, t-butyldimethylsilanol, triethylethoxysilane, and n-octadecyldimethylmethoxysilane were used as monofunctional compounds represented by the following general formula:

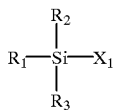

In the foregoing general formula, $X_1$ is a hydroxyl group, an alkoxy group, an acetoxy group, or a halogen atom; and $R_1$, $R_2$ and $R_3$ are independently an alkyl group, a phenyl group, an alkyl group wherein a part or the whole of hydrogen atoms are substituted by fluorine atom or atoms, or a phenyl group wherein a part or whole of hydrogen are substituted with fluorine atom or atoms.

1-Tetradecanol, 1H, 1H-perfluorooctan-1-ol, and pentadecanoic acid were used as monofunctional compounds represented by the following general formula:

In the foregoing general formula, $X_2$ is a hydroxyl group or a carboxyl group, and $R_4$ is an alkyl group wherein a part or whole of hydrogen atoms are substituted with fluorine atom or atoms, or a phenyl group wherein a part or whole of hydrogen atoms are substituted with fluorine atom or atoms.

All these monofunctional compounds were compounds having only one group reactable with a hydroxyl group or a carboxyl group.

Carrier 5 was impregnated with the aforementioned monofunctional compounds. Continuous operating tests were carried out at an apparatus temperature of 70° C. for 1,000 hours. Results of head surface inspection are shown in Table 1.

TABLE 1

| Run No. | Monofunctional compound | Head surface after test | Remark |
|---|---|---|---|
| 1 | None | Smearing occurred | Comp. Ex. |
| 2 | t-Butyldimethylsilanol | Smearing not occurred | Example |
| 3 | Triethylethoxysilane | " | " |
| 4 | n-Octadecyldimethyl-methoxysilane | " | " |
| 5 | 1-Tetradecanol | " | " |
| 6 | 1H, 1H-Perfluorooctan-1-ol | " | " |
| 7 | Pentadecanoic acid | " | " |

As is apparent from the foregoing, debris formation on the head and disk by contaminants can be prevented and occurrence of fatal troubles to the magnetic disk apparatus can be prevented by providing monofunctional compounds in the gas phase in the magnetic disk apparatus.

EXAMPLE 2

Figure 8:
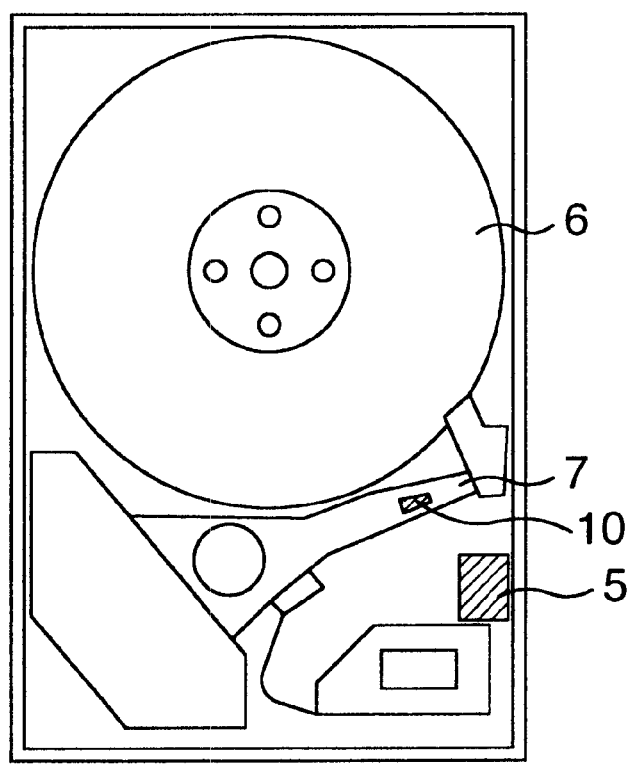
FIG. 8 is a schematic view showing a magnetic disk apparatus according to Example 2.

A magnetic disk apparatus used in this Example is shown in FIG. 8. Molecular sieve was used as porous carrier 5 for supporting a monofunctional compound. A 2.5-inch type glass substrate was used for magnetic disk 6, where a magnetic medium for magnetic recording and a protective overcoat layer comprising carbon as the main component were successively formed on the disk surface, and a perfluoropolyether-based lubricant was applied to the outermost disk surface.

Magnetic head 8 was fixed to the tip end of suspension 7 through gimbal 9, as shown in FIG. 7. Furthermore, piezo sensor 10 for detecting any contact between the head and the disk was provided on suspension 7. A sintered material composed of $Al_2O_3$ and TiC was used as a head slider material. A protective overcoat comprising carbon as the main component was formed on the air bearing surface of the head. The magnetic disk apparatus was provided with a cover through packing, though not shown in the drawing, to tightly seal the apparatus casing to some degree, thereby isolating the apparatus inside from the surrounding atmosphere. The disk was rotatable at 4,200 rpm. The apparatus was further provided with a motor for disk revolution, VCM (Voice Coil Motor) for head seek, an electric circuit for apparatus control, etc.

Molecular sieve as carrier 5 was impregnated with n-octadecyldimethylmethoxysilane as a monofunctional compound. Continuous operating test was carried out as a pretreatment at an apparatus temperature of 70° C. for 1,000 hours. Then, carrier 5 was taken out from the apparatus. Another molecular sieve impregnated with n-octyltrimethoxysilane as a contaminant was provided as carrier 5 in the magnetic disk apparatus to intentionally provide the contaminant therein. Then, continuous operating test was carried out at an apparatus temperature of 70° C. to measure the time until contact between the head and the disk occurred. A comparative test was further carried out without any pretreatment with the monofunctional compound, i.e. only by intentionally providing the contaminant therein, as Comparative Example. Results are shown in Table 2.

TABLE 2

| Run No. | Monofunctional compound | Time till contact occurrence | Remark |
|---|---|---|---|
| 8 | Provided | 500 hr. | Example |
| 9 | None | 1 hr. | Comp. Ex. |

It is apparent from the foregoing that the magnetic disk apparatus subjected to the continuous operating test with the pretreatment of the monofunctional compound less suffers from troubles by the contaminant even after the removal of the monofunctional compound-impregnated carrier therefrom (Example) than in the continuous operating test without any such pretreatment of the monofunctional compound, i.e. only by intentionally providing the contaminant therein (Comparative Example). This shows that the monofunctional compound undergoes polymerization reaction at contaminant-adsorbable sites such as hydroxyl group, etc. on the head or disk, thereby inhibiting the adsorption sites from any adsorption of the contaminants and preventing troubles by the contaminants.

EXAMPLE 3

Effect of concentrations of monofunctional compound on suppression of troubles by the contaminants was examined in this Example.

Figure 9:
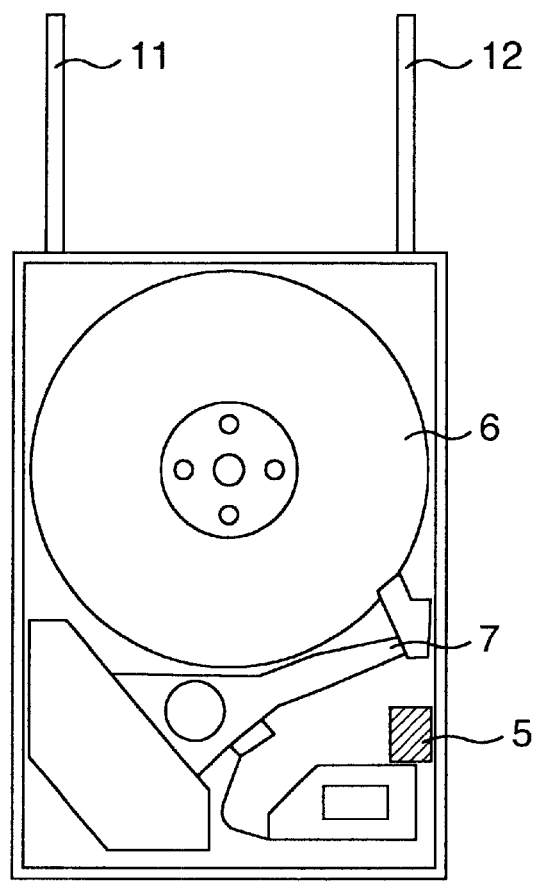
FIG. 9 is a schematic view showing a magnetic disk apparatus according to Example 3.

A magnetic disk apparatus used in this Example is shown in FIG. 9. A 2.5-inch type glass substrate was used for magnetic disk 6, and a magnetic medium for magnetic recording and a protective overcoat layer comprising carbon as the main component were successively formed on the surface of the substrate, and ultimately a perfluoropolyether-based lubricant was applied to the outermost surface thereof. Magnetic head 8 was fixed to the tip end of suspension 7 through gimbal 9, as shown in FIG. 7. A sintered material composed of $Al_2O_3$ and Tic was used as a head slider material. A protective overcoat comprising carbon as the main component was formed on the air bearing surface of the head. Reference numerals 11 and 12 show an inlet and an outlet, respectively, for a concentration-controlled monofunctional compound. The apparatus was provided with a cover through packings, though not shown in the drawing, to tightly seal the apparatus to some degree, thereby isolating the apparatus inside from the surrounding atmosphere. The disk was rotatable at 4,200 rpm. The apparatus was further provided with a motor for disk revolution, VCM (Voice Coil Motor) for head seek, an electric circuit for apparatus control, etc.

Triethylethoxysilane was used as a monofunctional compound. Continuous operating tests were carried out at an apparatus temperature of 70° C. for 1,000 hours, and then the head surfaces were inspected. Concentration of triethylethoxysilane was determined by gas chromatography (GC). Results are shown in Table 3.

TABLE 3

| Run No. | Triethylethoxysilane concentration | Head surface after test |
|---|---|---|
| 10 | 0 | Smearing occurred |
| 11 | 0.01 ppm | Slight smearing occurred |
| 12 | 1 ppm | No smearing occurred |
| 13 | 100 ppm | " |

It is apparent from the foregoing that troubles by contaminants can be prevented by providing even such a very small amount of the monofunctional compound as 0.01 ppm therein.

EXAMPLE 4

Various methods for providing a monofunctional compound into a magnetic disk apparatus were examined.

Figure 10:
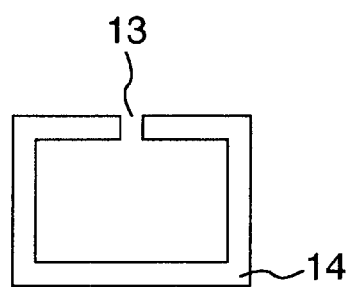
FIG. 10 is a schematic view showing an aluminum container with a fine throughhole.
Figure 11:
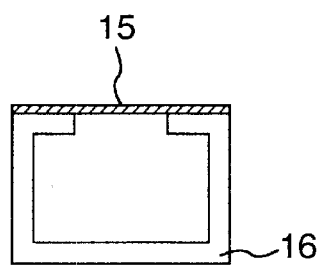
FIG. 11 is a schematic view showing an aluminum container isolated by a polyfluoroethylene film.

In a magnetic disk apparatus as shown in FIG. 6, various porous carriers were used as carrier 5 besides the molecular sieve. Furthermore, in place of the porous carriers, aluminum container 14 with fine throughhole 13 as shown in FIG. 10 and aluminus container 16 isolated with polyfluoroethylene film 15 as shown in FIG. 11 were used.

Triethylethoxysilane was used as a monofunctional compound. Continuous operating tests were carried out at an apparatus temperature of 70° C. for 1,000 hours, and then the head surfaces were inspected. The gas present in the magnetic disk apparatus was sampled after the continuous operating tests to determine a triethylethoxysilane concentration in the gas phase by GC. Results are shown in Table 4.

TABLE 4

| Run No. | Method for providing monofunctional compound | Triethylethoxysilane concentration | Head surface after test |
|---|---|---|---|
| 14 | Molecular sieve carrier | 850 ppm | No head smearing occurred |

TABLE 4-continued

| Run No. | Method for providing monofunctional compound | Triethylethoxysilane concentration | Head surface after test |
|---|---|---|---|
| 15 | Activated carbon carrier | 700 ppm | No head smearing occurred |
| 16 | Zeolite carrier | 750 ppm | No head smearing occurred |
| 17 | Al container with fine throughhole | 1000 ppm | No head smearing occurred |
| 18 | Al container isolated with polyfluoroethylene film | 1000 ppm | No head smearing occurred |

As is apparent from the foregoing that effects on prevention of contaminant-causing troubles are observable in all the runs, though there are differences in the gas phase concentration, depending on the methods for providing the monofunctional compound.

Figure 12:
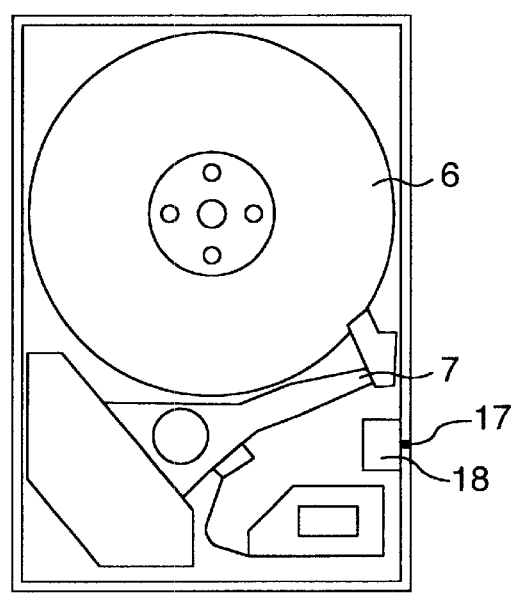
FIG. 12 is a schematic view showing a magnetic disk apparatus in a structure capable of introducing monofunctional compounds therein from the outside.
Figure 13:
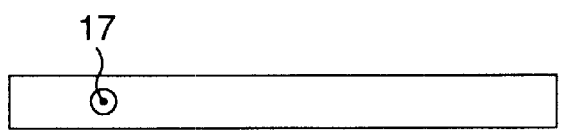
FIG. 13 is a side view of a magnetic disk apparatus in a structure capable of introducing monofunctional compounds therein from the outside.

The methods for providing the monofunctional compound in a container with a fine throughhole or a container isolated with an organic film, through which the monofunctional compound if it in a liquid or solid state, is hard to pass, but the compound only in a gaseous state can easily pass, are effective for introducing a liquid or solid monofunctional compound into the apparatus. Mechanism 17 capable of introducing the monofunctional compound from the outside, as shown in FIGS. 12 and 13, can be also used, where it is desirable to introduce the monofunctional compound into container 18 such as container 16 with fine throughhole 13 or container 16 isolated with organic film 15 such as polyfluoroethylene film, etc., as shown in FIG. 10 or FIG. 11, to hold the monofunctional compound. Even if the porous carrier is inserted into container 18, the same effects can be likewise obtained.

EXAMPLE 5

Figure 14:
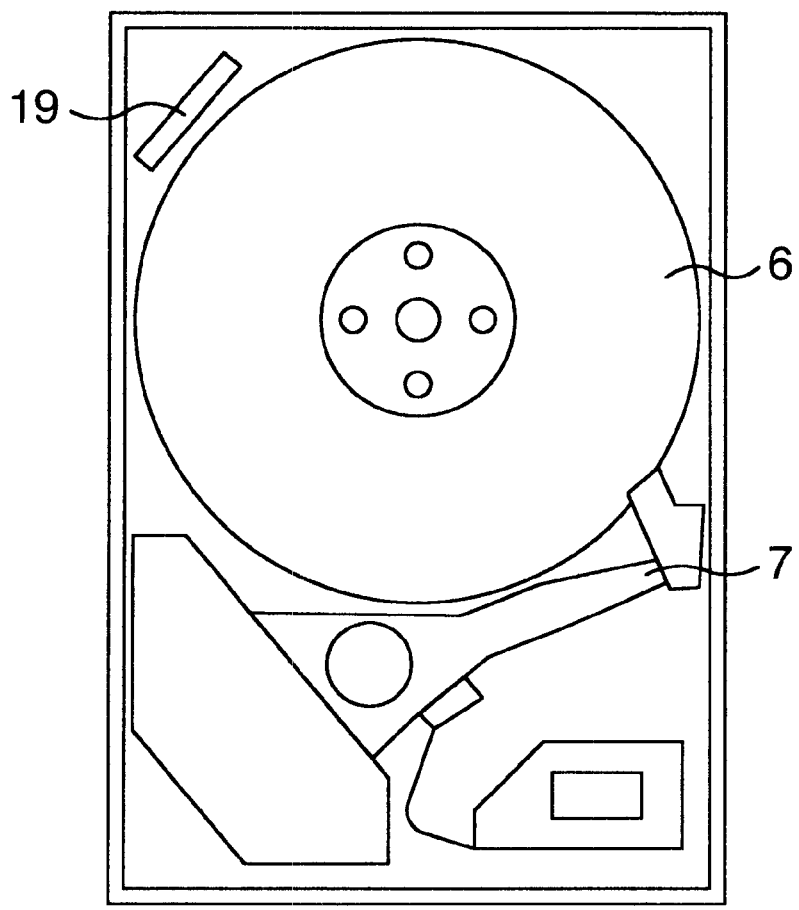
FIG. 14 is a schematic view showing a magnetic disk apparatus according to Example 5.

Structure of a magnetic disk apparatus according to this Example is shown in FIG. 14.

A 2.5-inch type glass substrate was used for magnetic disk 6, where a magnetic medium for magnetic recording and a protective overcoat layer comprising carbon as the main component were successively formed on the surface and ultimately a perfluoropolyether-based lubricant was applied to the outermost surface. Magnetic head 8 was fixed to the tip end of suspension 7 through gimbal 9, as shown in FIG. 8. A sintered material composed of $Al_2O_3$ and TiC was used as a head slider material. A protective overcoat comprising carbon as the main component was formed on the air bearing surface of the head. The apparatus was provided with a cover through packings, though not shown in the drawing, to tightly seal the apparatus casing, thereby isolating the apparatus inside from the surrounding atmosphere. The disk was rotable at 4,200 rpm. The apparatus was further provided with a motor for disk revolution, VCM (Voice Coil Motor) for head seek, an electric circuit for apparatus control, etc.

Adsorbent containing triethylethoxysilane as a monofunctional compound, enclosed with a gas-permeable organic film, was provided in the apparatus. Continuous operating test was carried out at an apparatus temperature of 70° C. for 1,000 hours, and the head surface was inspected. No head smearing was observed. That is, contaminants underwent chemisorption by providing the single functionality silane compound within the magnetic disk apparatus, and an effect on the prevention of debris formation on the head and magnetic disk surfaces was confirmed.

As described in the foregoing Examples, the present invention provides a means of maintaining the reliability of a magnetic disk apparatus for a long time not by removing the contaminants from the apparatus, but by preventing adsorption of the contaminants onto the protective overcoat, preventing intermolecular polymerization reaction of contaminants and by preventing adsorption of the contaminants onto the contaminant-adsorbable sites formed on the protective overcoat due to vanishing of the lubricant.

It seems that the troubles will occur due to growth of contaminants adsorbed on the head and the disk to debris of such sizes as to cause troubles by heat, etc. generated by the contact between the head and the disk. It also seems that trouble-causing contaminant species are substances capable of undergoing three-dimensional intermolecular polymerization reaction.

That is, the troubles causes by the contaminants can be prevented by providing a compound into the magnetic disk apparatus. The compound is capable of being adsorbed on such trouble-causing contaminant adsorbable sites through polymerization reaction, capable of undergoing polymerization reaction even with the contaminants thereafter without any further occurrence of polymerization reaction of the once adsorbed sites with the contaminants, capable of sealing the necessary functional groups of the contaminants for adsorption onto the adsorbable sites on the head and the disk through polymerization reaction with the contaminants. Even if the contaminants are adsorbed onto the head or the disk in the presence of such a compound, the compound will react with the functional groups of the contaminants, thereby inhibiting the trouble-causing intermolecular polymerization reaction of the contaminants.

Specifically, the troubles caused by the contaminants can be prevented by providing into the magnetic disk apparatus a compound having in the molecules only one functional group. The molecules are capable of undergoing polymerization reaction with functional groups such as —OH, etc. acting as contaminant-adsorbable sites on the head or the disk, as shown in the foregoing Examples.

Figure 2:
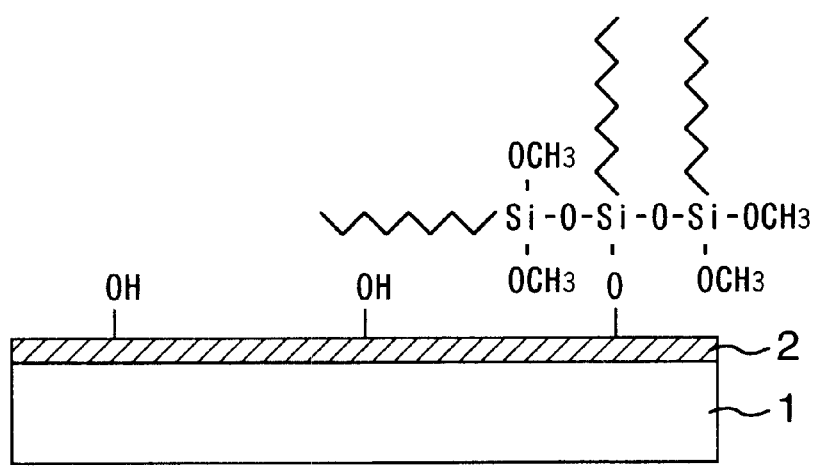
FIG. 2 is a schematic view showing the state of debris formation on the protective overcoat.

In the case that there are compounds having in the molecule a plurality of functional groups over the disk or the head, as shown in FIG. 1, intermolecular polymerization reaction will take place repeatedly, as shown in FIG. 2, to form three-dimensional macro-molecules on the protective overcoat of the head or the disk, acting as contaminants, where reference numeral 1 shows a head slider material composed of $Al_2O_3$—TiC, 2 a protective overcoat comprising carbon as the main component and 3 contaminants having in the molecule three functional groups (n-octyltrimethoxysilane).

Figure 3:
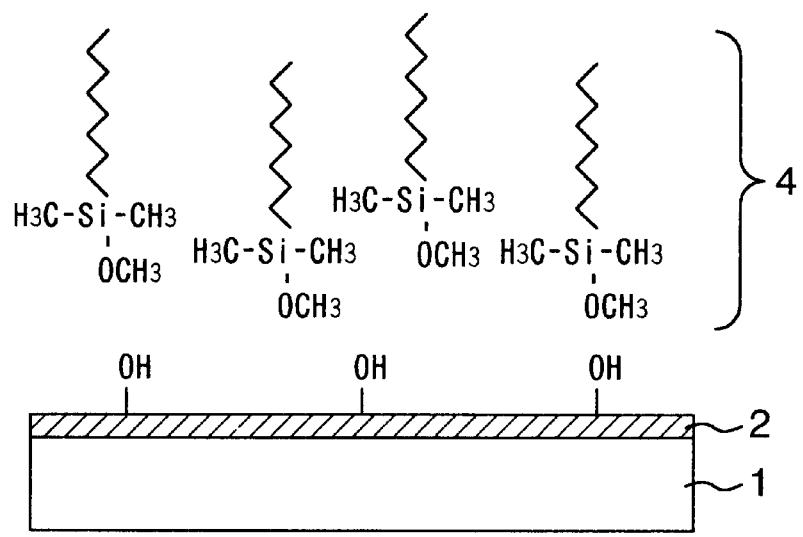
FIG. 3 is a schematic view showing the presence of hydroxyl groups on the surface of a protective overcoat and monofunctional compounds over the protective overcoat surface.
Figure 4:
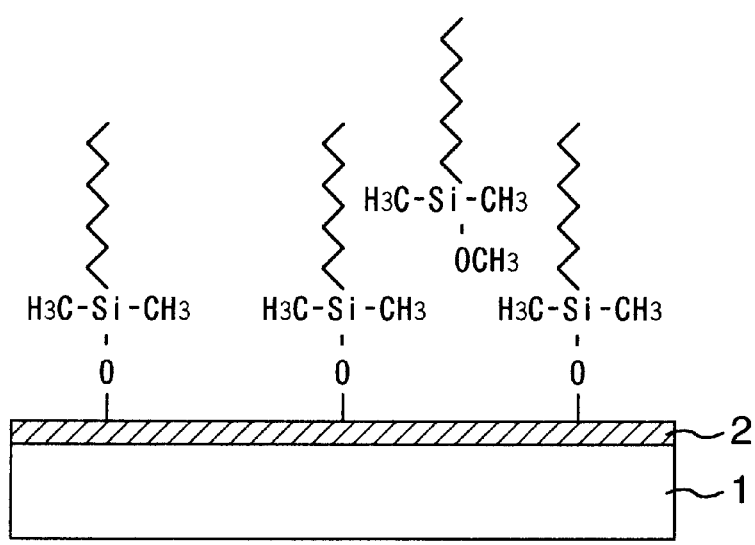
FIG. 4 is a schematic view showing the state of the monofunctional compounds under polymerization reaction with the hydroxyl groups on the protective overcoat surface.
Figure 5:
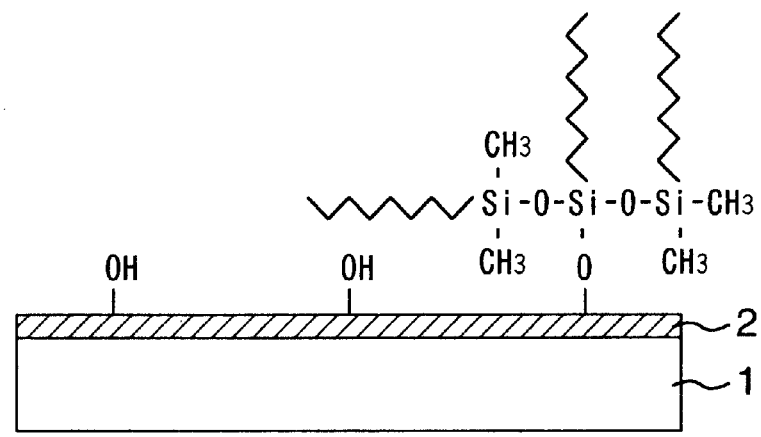
FIG. 5 is a schematic view showing the monofunctional compounds under polymerization with the adsorbed contaminants.

However, if there are compounds 4 having in the molecule only one functional group over the disk or the head as shown in FIG. 3, compounds 4 undergo polymerization reaction with the hydroxyl groups on the protective overcoat, as shown in FIG. 4, to prevent adsorption of the contaminants. Even if the contaminants are adsorbed on the disk or the head, as shown in FIG. 5, compounds 4 will inhibit intermolecular polymerization reaction of the contaminants, thereby preventing debris formation.

A single functionality silane compound is desirable as the compound to be provided in the apparatus to prevent troubles by contaminants, but the compounds having only one functional group in the molecule are satisfactory in the present invention, and thus alcohols having only one OH group or carboxylic acids having only one carboxyl group can be used in the present invention.

In the case of the single functionality silane compounds, the functional group is desirably a hydroxyl group or an alkoxy group, but can be also an acetoxy group or a halogen atom. Other functional groups than the OH group can react with $H_2O$ and ultimately can be converted to the hydroxyl group. As shown in Table 1 of Example 1, other groups than the functional groups of the single functionality silane compounds are desirably straight or branched saturated hydrocarbon groups, but may be a phenyl group, etc. A part or whole of hydrogens of these groups may be substituted with fluorine atom or atoms. It is not always necessary that all the other three groups than the functional group are the same groups. Monofunctional compounds can be bonded to the protective overcoat surface through the hydroxyl groups present on the protective overcoat surface of the head or disk, for example by dehydration polymerization reaction in the case of hydroxyl group as the functional group, by dealcohol polymerization reaction in the case of alkoxy group, by deacetic acid polymerization in the case of acetoxy group and by reaction with $H_2O$ to form a hydroxyl group, followed by dehydration reaction in the case of halogen atom or atoms.

In the case of other alcohols or carboxylic acids having only one functional group in the molecule than the single functionality silane compounds, the main chain is desirably a straight or branched saturated hydrocarbon group, but may be a phenyl group, etc., where a part or whole of hydrogen atoms in the main chain may be substituted with fluorine atom or atoms.

Vanishing of the lubricant or wearing of the protective overcoat by contact between the head and the disk is inevitable during the long-term operation of the magnetic disk apparatus. In the case of the protective overcoat surface is worm out slightly, contaminant-adosrbable sites such as hydroxyl groups, etc. are formed again on the protective overcoat surface by reaction with water or oxygen in the gas phase in the casing. Thus, it is necessary to maintain the trouble-preventing monofunctional compound at a desired concentration in the casing for a long time.

It has been shown in the foregoing that the trouble-preventing monofunctional compound is supported on porous carriers such as activated carbon, molecular sieve, silica gel, zeolite, etc., or organic polymers. Since a given amount of the monofunctional compound is provided in the gas phase in the casing, a monofunctional compound that is in a solid or liquid state at the ordinary temperature can be used, so far as it has a substantial vapor pressure. It has been shown in the foregoing that, when a monofunctional compound in a liquid or solid state is to be provided in the casing, it is desirable to provide the monofunctional compound in a container with a fine throughhole or a container isolated with a gas-permeable organic film to prevent attachment of a liquid to the head or the disk or prevent intrusion of a solid into the space between the head and the disk.

Particularly in the case that the monofunctional compound is in a liquid state at the ordinary temperature, it can be provided, as impregnated in a porous carrier, into a container with a fine throughhole or a container isolated with a gas-permeable organic film. In the case of introducing a monofunctional compound into the magnetic disk apparatus from the outside, at has been also shown in the foregoing Example that, when the monofunctional compound is in a liquid or solid state at the ordinary temperature, it is desirable to introduce it into a container with a fine throughhole or a container isolated with a gas-permeable organic film provided in the casing.

It has been also shown in the foregoing Example that it is desirable to provide an adsorbent containing the monofunctional compound in the magnetic disk apparatus.

According to the present invention, troubles by contaminants can be prevented while operating the magnetic disk apparatus for a long time and the reliability of the magnetic disk apparatus can be maintained for a long time.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications as falling within the ambit of the appended claims.

What is claimed is:

1. A magnetic disk apparatus which comprises a casing, and at least a magnetic medium for recording information, a magnetic head for recording and reproducing magnetic information on the magnetic medium, and a mechanism for driving the magnetic medium and the magnetic head, each provided in the casing, wherein at least one monofunctional compound selected from the group consisting of single functionality silane compounds is provided in the gas phase in the casing.

2. A magnetic disk apparatus according to claim 1, wherein the single functionality silane compounds are represented by the following general formula:

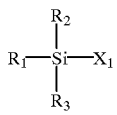

where $X_1$ is a hydroxyl group, an alkoxy group, an acetoxy group or a halogen atom; and $R_1$, $R_2$, and $R_3$ are independently an alkyl group, a phenyl group, an alkyl group wherein a part or whole of hydrogen atoms are substituted with fluorine atom or atoms, or a phenyl group wherein a part or whole of hydrogen atoms are substituted with fluorine atom or atoms.

3. A magnetic disk apparatus according to claim 1, wherein the at least one monofunctional compound is supported on a porous carrier or organic polymer material.

4. A magnetic disk apparatus according to claim 1, wherein the at least one monofunctional compound is held in a container with a fine throughhole.

5. A magnetic disk apparatus according to claim 1, wherein the at least one monofunctional compound is held in a container isolated with a gas-permeable organic film.

6. A magnetic disk apparatus according to claim 1, wherein a means for supplying the at least one monofunctional compound into the casing from the outside thereof is further provided at the casing.

7. A magnetic disk apparatus according to claim 1, wherein the at least one monofunctional compound is selected from the group consisting of t-butyldimethylsilanol, triethylethoxysilane, and n-octadecyldimethylmethoxysilane.

* * * * *